US011708084B2

(12) United States Patent
Dadam et al.

(10) Patent No.: US 11,708,084 B2
(45) Date of Patent: Jul. 25, 2023

(54) VEHICLE SOUND ATTENUATION

(71) Applicant: Ford Global Technologies, LLC, Dearborn, MI (US)

(72) Inventors: Sumanth Reddy Dadam, Dearborn, MI (US); Vinod Kumar Ravi, Canton, MI (US); Hani Mohammad Ayesh, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 731 days.

(21) Appl. No.: 16/694,424

(22) Filed: Nov. 25, 2019

(65) Prior Publication Data
US 2021/0155258 A1 May 27, 2021

(51) Int. Cl.
*B60W 50/14* (2020.01)
*F01N 13/08* (2010.01)
*F01N 1/16* (2006.01)

(52) U.S. Cl.
CPC .............. *B60W 50/14* (2013.01); *F01N 1/166* (2013.01); *F01N 13/08* (2013.01); *B60W 2050/143* (2013.01); *H04S 2420/01* (2013.01)

(58) Field of Classification Search
CPC .......... B60W 50/14; B60W 2050/143; B60W 50/00; F01N 1/166; F01N 13/08; F01N 13/087; F01N 2240/36; F01N 9/00; F01N 1/065; H04S 2420/01; Y02T 10/40
See application file for complete search history.

(56) References Cited

U.S. PATENT DOCUMENTS

| 6,937,165 | B2 | 8/2005 | Rogers |
| 8,857,561 | B2 | 10/2014 | Abram et al. |
| 10,100,098 | B2 | 10/2018 | Zimmerman et al. |
| 2009/0132155 | A1* | 5/2009 | Kojima ............... F02D 41/0002 701/113 |
| 2012/0230504 | A1 | 9/2012 | Kuroda |
| 2015/0267628 | A1* | 9/2015 | Bohn ...................... F02D 29/02 701/112 |
| 2017/0303037 | A1 | 10/2017 | Kobayashi et al. |
| 2018/0238208 | A1* | 8/2018 | Saxman .................. F01N 1/165 |
| 2019/0111841 | A1* | 4/2019 | Yamanashi ......... B60W 30/143 |

FOREIGN PATENT DOCUMENTS

WO    WO-2012097150 A1 *  7/2012  ............. G10L 17/26

* cited by examiner

*Primary Examiner* — Michael V Kerrigan
(74) *Attorney, Agent, or Firm* — Frank Lollo; Eversheds Sutherland (US) LLP

(57) ABSTRACT

Vehicle sound attenuation systems and methods are provided herein. An example method includes determining a triggering event for a vehicle using an advanced driver assisted technology system, and controlling a sound enhancing system of the vehicle in response to the triggering event. Controlling the sound enhancing system may include attenuating engine or exhaust sound produced by the sound enhancing system of the vehicle.

20 Claims, 4 Drawing Sheets

VEHICLE SOUND ATTENUATION

TECHNICAL FIELD

The present disclosure relates to vehicle sound attenuation, and more particularly, but not by way of limitation, to systems and methods of attenuating enhanced vehicle sounds to optimize a driver's ability to perceive audible in-vehicle alerts.

BACKGROUND

Ford's Lane Keeping Assist™ provides driver assistance by producing a steering wheel vibration when the system detects an unintended lane departure and can provide steering toque input toward the lane center when the system detects an unintended lane departure. Audible warnings can also be provided such as virtual rumble strip sounds and beeps. These audible in-vehicle alerts are provided through speakers within the cabin of the vehicle. Vehicles may be equipped with engine sound enhancing features, such as an exhaust tuning valve (EXTUN) and/or an engine sound enhancement (ESE) control system, which create an audible performance aesthetic for the vehicle.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein can be configured to attenuate vehicle sounds during times when audible warning sounds are provided within a cabin of the vehicle. In general, the systems and methods attenuate enhanced engine and exhaust sounds created by EXTUN and/or ESE control systems. EXTUN is an active exhaust acoustic tuning system that can use a variable position EXTUN valve. The variable position EXTUN valve can be used to selectively increase or decrease exhaust or engine sounds produced by the vehicle. The systems and methods of the present disclosure can also be used with passive exhaust acoustic tuning systems.

ESE control systems provide enhanced engine sounds through the entertainment or legacy audio system of a vehicle. The ESE control system implements an engine sound enhancement (ESE) or sound-imposer algorithm, either by playing a pre-recorded engine sound through the stereo system determined by engine load and RPM, or having the microphone array capture sound signals from the drive train, which the processor amplifies and tunes to give drivers a better feel for the engine.

An in-vehicle driver warning system (also referred to as advanced driver assistance technology) can be used to alert a driver to events such as an impending lane departure, a lane change, a potential collision, and/or when a vehicle is entering a curve—just to name a few. The in-vehicle driver warning system can include inducing vibration in a steering wheel or seat of the vehicle. The in-vehicle driver warning system can also include outputting audible tones or warnings output into the cabin of the vehicle.

Systems and methods disclosed herein can be configured to attenuate EXTUN and/or ESE control systems to improve the ability of a user to hear audible warnings produced by an in-vehicle driver warning system. Some example implementations include selectively controlling a valve of an EXTUN control system to reduce exhaust noise or terminating engine or exhaust sounds created by an ESE control system.

Illustrative Embodiments

Figure 1A:
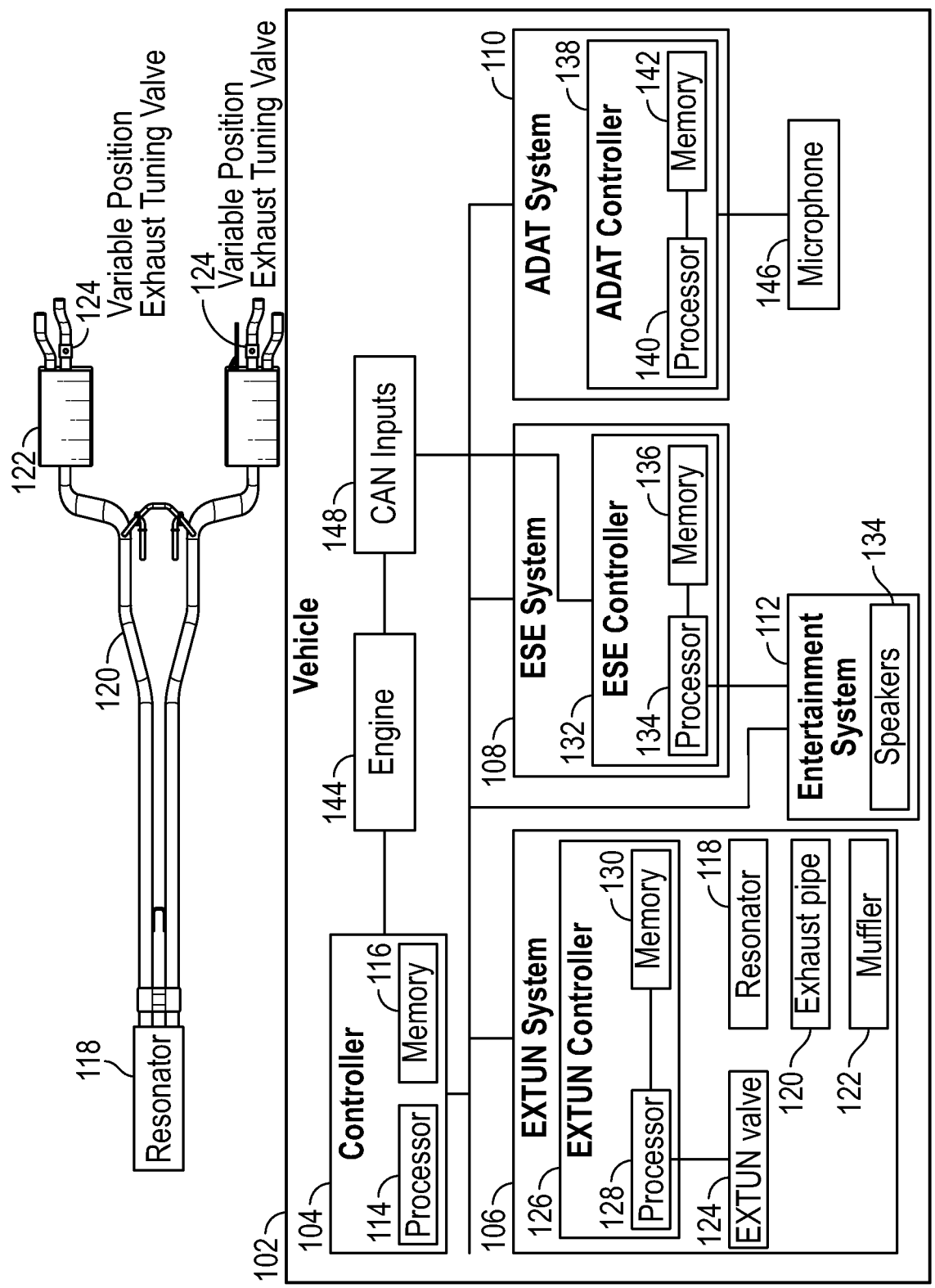
FIG. 1A depicts an illustrative architecture in which techniques and structures for providing the systems and methods disclosed herein may be implemented.
Figure 1B:
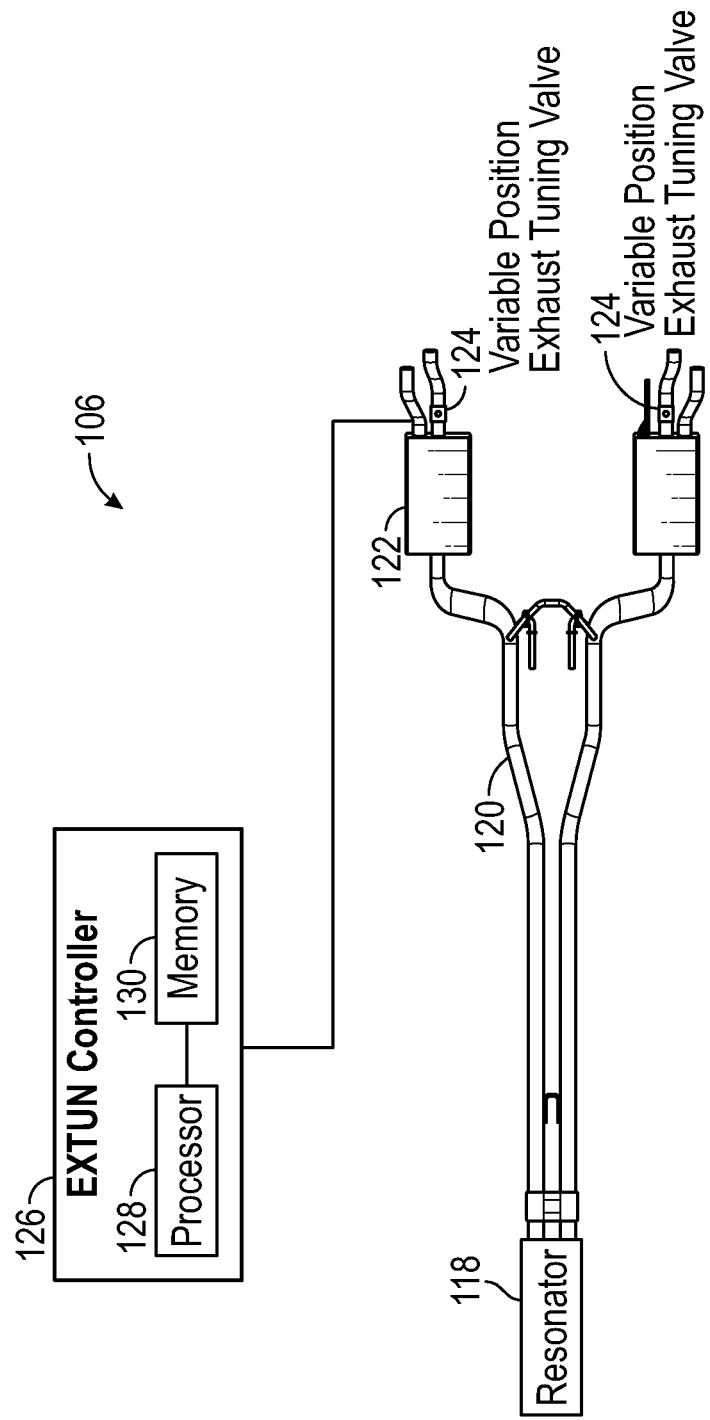
FIG. 1B is a detail view of an example exhaust tuning valve (EXTUN) system that can be selectively controlled using aspects of the present disclosure.

Turning now to the drawings, FIGS. 1A and 1B collectively depict an illustrative architecture 100 in which techniques and structures of the present disclosure may be implemented. The illustrative architecture 100 may include a vehicle 102 comprising a controller 104, an exhaust tuning valve system (EXTUN system 106), an engine sound enhancement system (ESE system 108), and an advanced driver assistance technology system (ADAT system 110), and an entertainment system 112. The EXTUN 106 and/or the ESE system 108 are collectively or individually referred to as a sound enhancing system. In general, the EXTUN system 106 enhances engine or exhaust sound through control of an EXTUN valve and the ESE system 108 enhances engine or exhaust sound by the creation of virtual engine or exhaust sounds provided through the entertainment system 112. Additional details on these sound enhancing system(s) are provided infra.

In some embodiments, the controller 104 may comprise a processor 114 and memory 116. The memory 116 stores instructions that are executed by the processor 114 to perform aspects vehicle sound attenuation as disclosed throughout. When referring to operations executed by the controller 104 it will be understood that this includes the execution of instructions by the processor 114. Specific details regarding controller 104 functions with respect to vehicle sound attenuation will be described in greater detail infra with reference to various example use cases. In general, the controller 104 can be a dedicated, stand-alone processing unit that can be installed in any desired location in the vehicle 102. In some embodiments, the controller 104 can be the controller of the ADAT system 110. For example, the vehicle sound attenuation features disclosed herein with respect to the controller 104 can be implemented as executable logic that can be provisioned in any controller of a vehicle system disclosed herein. For brevity and clarity the controller 104 discussed herein will be disclosed as a dedicated, stand-alone processing unit, but should not be limited as such.

In various embodiments, the EXTUN system 106 can include an active or passive system that is used to increase or decrease exhaust sounds. In one embodiment, the EXTUN system 106 provides active exhaust acoustic tuning (e.g., volume control) using a variable position EXTUN valve. For example, the EXTUN system 106 can include a resonator 118, an exhaust pipe 120, a muffler 122, and an EXTUN valve 124 (e.g., adjustable position valve). A detailed view of the EXTUN system 106 is provided in FIG. 1B. In some embodiments, multiple exhaust pipes, mufflers, and EXTUN valves may be utilized. In general, the EXTUN system 106 is controlled through an EXTUN controller 126 that includes a processor 128 and memory 130. The EXTUN controller 126 can selectively adjust the EXTUN valve 124 through various positions to increase and/or decrease a volume of exhaust sound produced by the EXTUN system 106. In general, the EXTUN system 106 can utilize inputs such as exhaust mode, gear selection, engine RPM (revolutions per minute), pedal position, and the like, to determine a corresponding valve position (e.g., percent valve is open or closed), as well as an overall sound level.

The ESE system 108 is generally configured to output virtual engine and/or exhaust sounds into a cabin of the vehicle 102 through the entertainment system 112. For example, the ESE system 108 can create audio that amplifies or mimics engine sounds or exhaust sounds. These sounds provide an audible aesthetic to users within the vehicle 102. The ESE system 108 can also include an ESE controller 132 having a processor 134 and memory 136.

In more detail, the ESE system 108 can dynamically generate ESE sounds based upon the various controller area network (CAN) inputs. The ESE system 108 can utilize a calibration file to relate how a mock engine sound is to be generated in relation to the various CAN inputs 148. In some embodiments, the ESE system 108 may evaluate a drive mode or convertible state, an engine order, an engine RPM, a pedal position, engine torque, and so forth to select a corresponding sound level for the ESE output.

ESE audio can be generated by a Digital Audio Control Module (DACMC) (such as a "daughter card" within the entertainment system 112). After the sound is generated, the entertainment system 112 can mix ESE audio with "main" audio ("main"=AM/FM/CD/Satellite) inside the entertainment system 112, and route the mixed audio to the appropriate speakers, such as speakers 115 associated with the entertainment system 112. This process can be used to for systems without a separate audio amplifier module (i.e., non-branded audio systems).

Alternatively, the ESE audio (separate from the "main" audio) can be routed to the audio amplifier module (could be included in the entertainment system 112), and this audio amplifier module mixes the ESE audio with the "main" audio. The mixed audio is then to the appropriate speakers. This process can be used in systems with a separate audio amplifier module (i.e., branded audio systems). In general, the entertainment system 112 may be responsible for providing the ESE audio with speakers in the cabin (no underhood/external speakers are used).

The ADAT system 110 is generally configured to use a plurality of inputs from various associated sensors 111. Example sensors can include cameras, radar, motion sensors, or other similar sensors that determine if the vehicle is attempting to change lanes, if there are adjacent vehicles that would pose a collision concern, if the vehicle is approaching a road curvature, or any other similar vehicle event that can be used as the basis for providing a driver the vehicle with advanced warning. The ADAT system 110 can comprise an ADAT controller 138 having a processor 140 and memory 142. The ADAT controller 138 can be communicatively coupled with the entertainment system 112 in some embodiments. The ADAT controller 138 can generate output in the form of audible warning signals provided through the entertainment system 112. The audible warning signals could include warning tones, natural or spoken language words or phrases, rumble strip sounds, and so forth. The ADAT controller 138 can also effectuate other warnings such as steering wheel vibrations, automatic steering wheel control, vehicle deceleration, and so forth.

As noted above, the controller 104 can be configured to attenuate sounds created by either or both of the EXTUN system 106 and the ESE system 108 when the ADAT system 110 has created audible warning signals that are to be output by the entertainment system 112. The controller 104 can attenuate sounds produced by the EXTUN system 106 by causing the EXTUN controller 126 to open or close the EXTUN valve 124 to reduce a sound level emitted by the exhaust system of the vehicle 102. The opening or closing of the EXTUN valve 124 can be accomplished through a connected actuator such as a motor or solenoid. The controller 104 can attenuate sounds produced by the ESE system 108 by causing the ESE controller 132 to reduce or zero-out an amplitude of audio signals generated by the ESE system 108 that would be output through the entertainment system 112. In some embodiments, the controller 104 can instruct the ADAT system 110 to increase a volume for the audible warning sounds. In one example embodiment, the ADAT system 110 can cause the entertainment system 112 to increase volume prior to playing audible warning sounds through the vehicle speakers.

Specific use case examples follow which provide additional details regarding direct or indirect control of the EXTUN system 106 and/or the ESE system 108 by the controller 104 to attenuate sounds that would distract the user when an audible warning signal is output by the ADAT system 110 and/or the entertainment system 112. In various embodiments, the controller 104 can be triggered to cause the EXTUN system 106 and/or the ESE system 108 to attenuate their respective sounds when the controller 104 determines that the ADAT system 110 has output an audible warning sound. In various embodiments, the sounds of the EXTUN system 106 and/or the ESE system 108 can be attenuated before the audible warning sound is output through speakers associated with the entertainment system 112.

Figure 2:
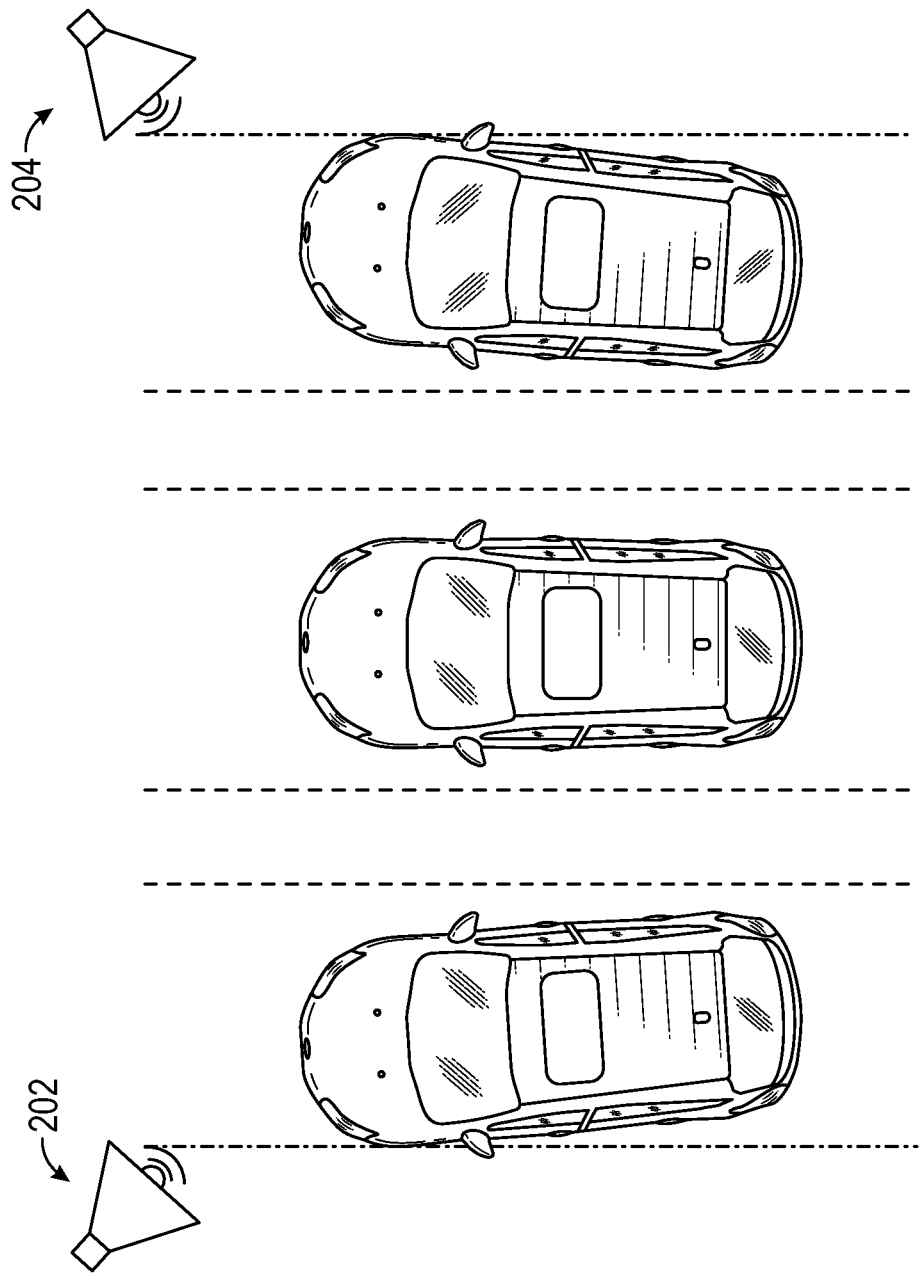
FIG. 2 illustrates various driving conditions and the delivery of audible in-vehicle alerts.

Referring now collectively to FIGS. 1A, 1B, and 2, which illustrate an example use case for implementing the systems and methods disclosed herein. In general, FIG. 2 illustrates a vehicle in a lane departure scenario where an example ADAT system 110 detects a leftward lane departure of the vehicle 102. When the vehicle 102 departs leftward, the example ADAT system 110 outputs a beep or audible rumble strip sound 202 from the leftmost speakers within the vehicle 102. The same scenario occurs when a rightward lane departure of the vehicle 102 is detected by the ADAT system 110. In this instance, the example ADAT system 110 outputs a beep or audible rumble strip sound 204 from the rightmost speakers within the vehicle 102. To be sure, the ADAT system 110 can provide the output signals to an entertainment system 112 of the vehicle 102.

When the ADAT system 110 determines a risk of collision with an overtaking vehicle in an adjacent lane (even if the turn signals are operating), the ADAT system 110 can activate steering control to assist in avoiding a collision. In another example, when a dynamic radar cruise control with full speed range is in operation, a lane departure alert of the ADAT system 110 warns the driver by vibrating the steering wheel or sounding an audible alert. An indicator may also be provided in a multi-information display and within an available heads up display (if present). The ADAT system 110 can also apply steering assistance to help the driver in avoiding a lane departure.

In general, the controller 104 can detect triggering events related to dangerous driving conditions for the vehicle 102. The triggering events can be detected by the ADAT system 110 based on sensor input. Thus, the controller 104 can determine when the ADAT system 110 senses a triggering event. This process is implemented within the DAT system 110, when the vehicle sound attenuation features of the present disclosure are implemented at the ADAT system 110 level.

The controller 104 can be used to ensure that audible warnings can be clearly communicated to the user by reducing or eliminating noise generated by engine and/or exhaust. This can include scheduling an engine 144 of the vehicle 102 to enter a quiet operate mode, controlling the EXTUN system 106 to close the EXTUN valve 124 to close to reduce a magnitude of sound produced by the exhaust system of the vehicle 102. In some embodiments, a quiet operating mode can be effectuating by determining more or less active exhaust valve control opening position (i.e., more or less noisy). This would allow for other considerations to be taken into account such as requirements for a "noisier operation" due to load restriction avoidance for max power if accelerator pedal depressed to large degree or for more airflow required during catalyst heating or particulate filter regeneration operation. These requests could also be ignored during specific FMEM (failure mode effects management) operations for other exhaust devices, such as when closing the EXTUN valve 124 for quiet mode might lead to engine exhaust valve lift in the cylinder due to excessive backpressure.

The controller 104 can also control, directly or indirectly, the ESE system 108 to ensure that little to no amplification of engine sounds is produced. The ESE system 108 can respond by reducing or zeroing out any desired amplitude of a sound enhancement signal produced by the ESE system 108 so as to reduce or eliminate virtual engine or exhaust sounds that are delivered to the cabin of the vehicle 102 through the entertainment system 112. Control of the engine 144 can be effectuated through a native electronic engine control system of the vehicle 102.

In one example embodiment, the ESE calibration used to reduce or zero-out amplitudes can be table-based. In another embodiment, the ESE calibration used to reduce or zero-out amplitudes could include an equation where the ESE output is a function of engine speed, pedal position (e.g., throttle), engine torqued, vehicle drive mode, or various combinations and/or permutations thereof.

The ESE system 108 can utilize sensor inputs from a lane changing controller such as the ADAT system 110 rather than waiting for commands from a vehicle PCM (engine speed dependent) as this may add latency. Alternately the ESE system 108 can amplify an audible warning sound based on a direction of lane change (left or right lane). For example, if the vehicle 102 attempts a left/right lane change the ESE system 108 can amplify any audible warning sound by sending a beep or rumble strip on the left/right speaker(s). As noted above, vehicle sound attenuation features disclosed herein can be implemented within the ADAT system 110 to reduce latency. That is, when the ADAT system 110 is about to output an audible warning sound, the ADAT system 110 can execute the vehicle sound attenuation feature to cause the EXTUN system 106 and/or the ESE system 108 to attenuate any sound being produced.

Another example use case relates to instances where the ADAT system 110 has detected a potential collision. The ADAT system 110 can determine from one or more of the sensors 111, such as a millimeter-wave radar that a collision with an adjacent vehicle is likely. That is, the millimeter wave radar can be used to track an adjacent vehicle by monitoring its position. When the vehicle 102 implements a vehicle following function to follow the preceding vehicle a line graphic leading to the vehicle ahead appears in a multi-information display (such as the entertainment system 112, a head's up display, or other human machine interface). The ADAT system 110 applies steering control to follow the adjacent vehicle at a specified distance. In these situations, as well as other collision-prone conditions such as traffic jams any enhanced vehicle sounds produced by the EXTUN system 106 and/or the ESE system 108 can be attenuated in response to the ADAT system 110 producing audible warning sounds.

Another example use case includes the vehicle 102 entering a curved area of a road. In general, the vehicle 102 can utilize navigation data (from an onboard navigation system, which is not shown) to determine if the vehicle is entering a curve too fast. The ADAT system 110 is generally configured to prompt the driver with a visible and/or audible warning. The ADAT system 110 can also automatically and smoothly decelerate the vehicle if the system detects gentle meandering or abrupt steering indicating that the driver may have lost concentration. In another embodiment, a vehicle sway warning can be implemented to alert the driver by sounding an audible alert and showing a message in the multi information display if the system detects that the drivers hands are off the steering wheel the lane tracing assist hands off wheel warning appears in the multi information display and an audible alert is sounded lane change assist can automatically perform a lane change.

When in a curve related situation, abrupt steering operation, or lost concentration situation by the driver, the ADAT system 110 can be controlled to attenuate virtual engine and/or exhaust sounds (such as take-off/acceleration sounds). That is, these sounds can be optimized to produce a more quiet engine/exhaust sound by controlling the engine 144 of the vehicle 102 to enter a quiet operate mode (described in greater detail supra), controlling the EXTUN system 106 to close the EXTUN valve 124 to close to reduce a magnitude of sound produced by the exhaust system of the vehicle 102. In some embodiments, this attenuation includes zeroing out an amplitude from ESE system 108 during any of these operating conditions, allowing the driver to prioritize audible warning sounds produced by the ADAT system 110. In various embodiments, the ADAT system 110 can amplify an audible warning sound based on a direction of lane change (left or right lane), as discussed above.

In some embodiments, sound level measurements can be made within the cabin of the vehicle 102 by obtaining sound level measurements using a microphone 146 within the vehicle 102. In these instances, the controller 104 can measure a current decibel level within the vehicle 102 and provide this volume level assessment to the ADAT system 110. The ADAT system 110 can utilize this volume level assessment to select a desired volume level for audible warning sounds. In this way, the ADAT system 110 can ensure that the volume or amplitude of the audible warning sounds is greater than any ambient noise or sounds currently detectable within the cabin of the vehicle 102 through the microphone 146. Such a feature is valuable when attempting to overcome natural engine sounds produce by the engine of the vehicle 102, even when the sounds produced by the EXTUN and/or ESE systems have already been attenuated.

Figure 3:
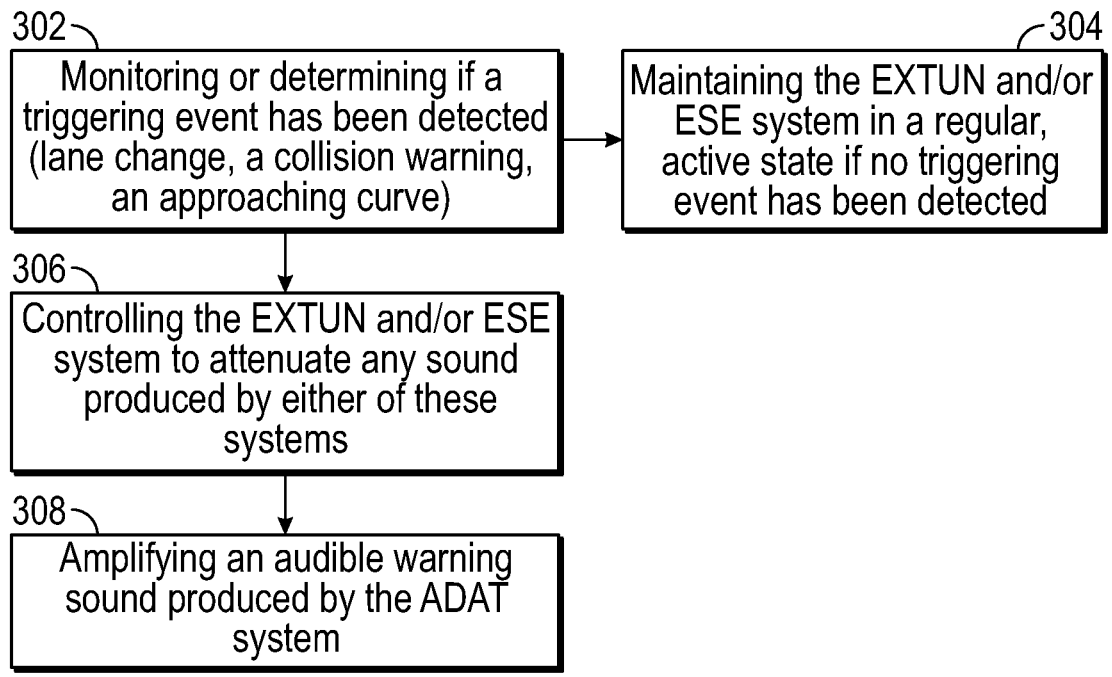
FIG. 3 is a flowchart of an example method of the present disclosure.

FIG. 3 is a flowchart of an example method of vehicle sound attenuation. The method can include a step 302 of monitoring or determining if a triggering event has been detected. The triggering event could include any of a lane change, a collision warning, an approaching curve, or any other driving related event where an ADAT system has been programmed to warn a driver using an audible warning sound.

Again, a lane change could be due to an intentional movement of the steering wheel or from inattentive driving. Collision warnings could be determined in combination with lane changes or alone when a potential collision with another vehicle is otherwise determined.

The method can include a step 304 of maintaining an EXTUN and/or ESE system in a regular, active state if no triggering event has been detected. If a triggering event is detected, the method can include a step 306 of controlling the EXTUN and/or ESE system to attenuate any sound produced by either of these systems. For example, this can include scheduling the engine to reduce engine noise, such as reducing acceleration of the engine that might produce excess noise. Sound produced by the EXTUN system can be attenuated when an EXTUN valve is adjusted to a more closed or entirely closed position. Virtual engine sounds produced by the ESE system can be attenuated by zeroing an amplitude of the virtual engine sounds.

The method can also include a step 308 of amplifying an audible warning sound produced by the ADAT system. Amplification ensures that the driver has a greater chance of hearing the audible warning sound when engine sounds and/or EXTUN and/or ESE system sounds cannot be completely attenuated. For example, it may be disadvantageous to reduce a driver's ability to accelerate in situations where evasive driving maneuvers are needed to avoid a collision. Thus, it may be deleterious to reduce natural engine sounds produced by the engine of the vehicle. In these instances, increasing the amplitude of the audible warning sounds may ensure that the driver has a greater chance of hearing the audible warning sound. The method can also include a step of providing the amplified audible warning sound to an occupant of the vehicle. This can include playing the amplified audible warning sound through the speakers of the vehicle.

Figure 4:
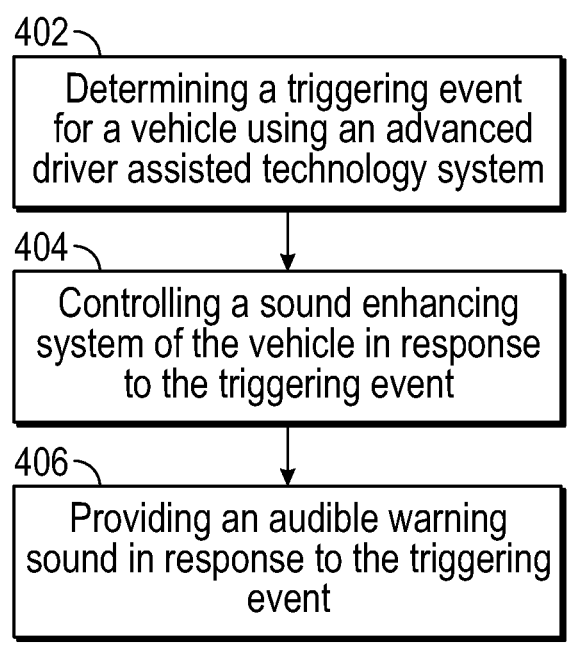
FIG. 4 is a flowchart of another example method of the present disclosure.

FIG. 4 is a flowchart of another example method of the present disclosure. The method can include a step 402 of determining a triggering event for a vehicle using an advanced driver assistance technology system. Again, the triggering event can include any dangerous vehicle-related condition determined by the advanced driver assistance technology system such as a lane departure, potential collision, or road curvature—just to name a few. The method can also include a step 404 of controlling a sound enhancing system of the vehicle in response to the triggering event. To be sure, this can include attenuating engine or exhaust sound produced by the sound enhancing system of the vehicle. Next, the method can include a step 406 of providing an audible warning sound in response to the triggering event. To be sure, the provision of the audible warning sound occurs after the attenuation of the engine or exhaust sound produced by the sound enhancing system of the vehicle. In some embodiments, attenuation of the engine or exhaust sound produced by the sound enhancing system can occur based on an impending output of the audible warning sound by the advanced driver assistance technology system.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method, comprising:
   determining a triggering event for a vehicle using an advanced driver assistance technology system;
   controlling a sound enhancing system of the vehicle in response to the determination of the triggering event, wherein controlling the sound enhancing system includes attenuating engine or exhaust sound produced by the sound enhancing system of the vehicle, and wherein the controlling of the sound enhancing system is at least partially based on at least one of a drive mode, a convertible state, an engine order, an engine RPM, a pedal position, and an engine torque; and
   wherein attenuating engine or exhaust sound includes controlling an exhaust tuning valve system of the sound enhancing system by at least partially opening or closing an adjustable position valve of the exhaust tuning valve system, wherein at least partially opening or closing the adjustable position valve is at least partially based on at least one of an exhaust mode, a gear selection, the engine RPM, and the pedal position.

2. The method according to claim 1, further comprising providing an audible warning sound in response to the determination of the triggering event, wherein providing the audible warning sound comprises mixing the audible warning sound with a main audio system of the vehicle.

3. The method according to claim 1, wherein the triggering event includes any of a lane departure warning, road curvature detection, and collision detection.

4. The method according to claim 1, wherein controlling the exhaust tuning valve system comprises partially opening or closing an adjustable position valve of the exhaust tuning valve system.

5. The method according to claim 1, wherein the sound enhancing system includes an engine sound enhancement system, and controlling the engine sound enhancement system includes zeroing out an amplitude of a sound enhancement signal of the engine sound enhancement system, the sound enhancement signal comprising a virtual engine or exhaust sound.

6. A system, comprising:
- a sound enhancing system of a vehicle, wherein the sound enhancing system comprises an exhaust tuning valve system; and
- a controller comprising a processor and a memory, the processor executing instructions stored in the memory to:
    - determine a triggering event for a vehicle, the triggering event being indicative of a dangerous driving condition for the vehicle; and
    - control the sound enhancing system of the vehicle in response to the determination of the triggering event, wherein control of the sound enhancing system includes attenuation of engine or exhaust sound produced by the sound enhancing system of the vehicle, and wherein the controlling of the sound enhancing system is at least partially based on at least one of a drive mode, a convertible state, an engine order, an engine RPM, a pedal position, and an engine torque; and
    - wherein attenuating engine or exhaust sound includes controlling the exhaust tuning valve system by at least partially closing an adjustable tuning valve of the exhaust tuning valve system, wherein at least partially closing the adjustable position valve is at least partially based on at least one of an exhaust mode, a gear selection, the engine RPM, and the pedal position.

7. The system according to claim 6, wherein the controller comprises an advanced driver assistance technology system.

8. The system according to claim 6, wherein the controller is further configured to control an engine of the vehicle to reduce engine noise or sounds produced by the engine.

9. The system according to claim 6, further comprising an entertainment system of the vehicle, wherein the controller is configured to cause the entertainment system to output an audible warning sound in response to the determination of the triggering event.

10. The system according to claim 6, wherein the controller is configured to cause the adjustable tuning valve to partially open or close in response to the determination of the triggering event to attenuate exhaust sounds produced by the exhaust tuning valve system.

11. The system according to claim 6, wherein the sound enhancing system comprises an engine sound enhancement system, wherein the controller is configured to cause the engine sound enhancement system to zero-out an amplitude of a sound enhancement signal of the engine sound enhancement system, the sound enhancement signal comprising a virtual engine or exhaust sound.

12. The system according to claim 6, wherein the controller is configured to cause an advanced driver assistance technology system to amplify an audible warning sound in response to the determination of the triggering event.

13. The system according to claim 12, wherein the controller is further configured to:
- determine a sound level within the vehicle; and
- amplify the audible warning sound in response to the sound level.

14. A vehicle, comprising:
- a processor and a memory, the processor executing instructions stored in the memory to:
    - determine a triggering event using an advanced driver assistance technology system; and
    - control a sound enhancing system of the vehicle in response to the determination of the triggering event, wherein the sound enhancing system comprises an exhaust tuning valve system having an adjustable position valve, and wherein the controlling of the sound enhancing system is at least partially based on at least one of a drive mode, a convertible state, an engine order, an engine RPM, a pedal position, and an engine torque; and
    - wherein controlling the sound enhancing system includes attenuating engine or exhaust sound produced by the sound enhancing system of the vehicle, wherein attenuating engine or exhaust sound includes at least partially closing the valve, wherein at least partially closing the adjustable position valve is at least partially based on at least one of an exhaust mode, a gear selection, the engine RPM, and the pedal position.

15. The vehicle according to claim 14, wherein the processor is further configured to detect the triggering event based on output generated by the advanced driver assistance technology system.

16. The vehicle according to claim 15, wherein the triggering event includes a dangerous condition determined by the advanced driver assistance technology system.

17. The vehicle according to claim 14, wherein the controller is configured to cause the adjustable position valve to partially open or close in response to the determination of the triggering event to attenuate exhaust sounds produced by the exhaust tuning valve system.

18. The vehicle according to claim 14, wherein the sound enhancing system comprises an engine sound enhancement system, wherein the processor is configured to cause the engine sound enhancement system to zero-out an amplitude of a sound enhancement signal of the engine sound enhancement system, the sound enhancement signal comprising a virtual engine or exhaust sound.

19. The vehicle according to claim 18, wherein the processor is configured to cause an entertainment system to provide an audible warning sound in response to the determination of the triggering event, wherein providing the audible warning sound comprises mixing the audible warning sound with a main audio system of the vehicle.

20. The vehicle according to claim 19, wherein the processor is configured to cause the advanced driver assistance technology system or the entertainment system to amplify an audible warning sound in response to the determination of the triggering event.

* * * * *